Patented Mar. 10, 1936

2,033,869

UNITED STATES PATENT OFFICE 2,033,869

TREE DRESSING

Claude H. Smith, Tallmadge, Ohio, assignor to Wingfoot Corporation, Wilmington, Del., a corporation of Delaware No Drawing. Application May 10, 1934, Serial No. 724,949

6 Claims. (Cl. 47—8)

This invention relates to a tree dressing. The dressing is plastic and trowellable, and comprises residue from the distillation of rubber.

In tree surgery some little difficulty has been experienced in obtaining an ideal dressing to be applied to a wound, such as that produced by the sawing off of a limb, which will protect the wound and yet allow the bark to again grow over the dressed area. The usual paints are not satisfactory since they cannot be applied to a moist or wet wood surface and they prevent the bark from healing over the wound.

According to this invention a tree wound is dressed with a composition which contains an asphalt, residue obtained from the distillation of rubber and inert filling material and preferably also some vegetable drying oil together with sufficient solvent to make the material plastic and yet not so thin that it cannot be applied in a thick layer. The dressing of this invention is applied preferably by trowelling and a layer of the dressing about $\frac{1}{16}$" thick over a fresh wound has been found to be of sufficient thickness to prevent the air from attacking the wood under the dressing and yet not so thick as to prevent proper healing. The composition is applied in a plastic condition and yet must be so compounded that a layer about $\frac{1}{16}$" thick will not flow appreciably after application under summer heat temperatures or become brittle and chip off in cold weather.

The asphalt employed may be a natural asphalt preferably one of the softer natural asphalts, or it may be such an asphalt as is produced by the blowing of petroleum residues with air. Hard natural asphalts such as gilsonite, mixed with softer natural or blown asphalts may be used. According to the preferred form of the invention such a blown asphalt with a flow point of 300 to 350 or 400° F. is employed.

The rubber residue is obtained by the distillation of crude or vulcanized rubber and according to the preferred form of the invention residue with a Shore hardness of 80 at 30° C. is utilized. This is obtained by distilling crude or vulcanized rubber with agitation in a still by heating to a temperature of between 250 and 300° C. To minimize decomposition of the rubber it is advantageous to add the rubber in small pieces to the still at a gradual rate so that any undissolved rubber in the still is surrounded with melted rubber. Crude rubber may be used for the preparation of the rubber residue of this invention although because of market conditions, scrap vulcanized rubber will ordinarily be employed. This scrap may be recovered from old tubes, tires, air bags, etc. If scrap rubber is employed, most or preferably all of any fabric material mixed with the rubber is first removed. The rubber is then preferably washed and cleaned before being added to the still. After distillation, such a rubber residue contains mineral ingredients not present in the residue from the distillation of crude rubber. Such mineral matter, however, is not detrimental, as a relatively large amount of filling material is employed in the tree dressing. Pine tar or softeners present in vulcanized rubber will be volatilized during the distillation.

L. E. Weber in the "Chemistry of Rubber Manufacture" gives the following as the products obtained by the dry distillation of washed and dried, fine, hard, Para rubber; isoprene ($C_5H_8$) 6.2%, dipentene ($C_{10}H_{10}$) 46.0%, heveene ($C_{15}H_{24}$) 17%, polyterpenes 26.8%, carbon residue 1.9%, mineral residue 0.5%, loss 1.4%. This indicates that the rubber residue which is utilized in the preferred form of this invention, when crude rubber is distilled, is that obtained when substantially all of the dipentene has been volatilized and little or no heveene has been distilled. The distillation of the rubber residue may be varied, and although a residue with a Shore hardness of 80 is preferred the residue may be somewhat harder or softer, e. g. 85–75 as an asphalt of lower or higher melting point is employed. A typical asphalt is that produced by the Robertson Asphalt Company and sold as their 400—A. This is produced by blowing petroleum residue to a melting point of 400° F. The tree dressing of this invention has been prepared by melting 233 pounds of the asphalt with 100 pounds of residue with a Shore hardness of 80 at 30° C. obtained by the distillation of rubber tire scrap. To the melted mixture 333 pounds of asbestos powder was added and the whole was thoroughly mixed. Then 32½ pounds of tung oil was added and after stirring, 233 pounds of varnish maker's naphtha was stirred into the mass, and the mixing continued until a uniform product was obtained.

Instead of using rubber tire scrap in the above formula, tube scrap or crude rubber or other vulcanized rubber or a mixture of rubbers may be used. Other fillers than powdered asbestos, such as silica or wood flour may be employed. The tung oil functions as a softener or plasticizer and other well known products may be used for this purpose such as other drying oils, e. g. linseed oil, etc. The amount of naphtha employed may be varied depending upon the amount of inert filler etc. used and the plasticity desired. Instead of naphtha other volatile solvents such as turpentine may be used.

This tree dressing will be found to adhere well to wet or moist wood and when applied to a fresh wound will stop the flow of sap. For example when a limb has been sawed off of a tree very close to the trunk so that the surface of the wound substantially coincides with the under bark surface of the tree, if a layer of this tree dressing about 1/16" thick is applied it will be found that the flow of sap is stopped and that the wound is sealed from the air and the deteriorating effect of the atmosphere is thus prevented. About a year after such treatment of the wound it will be found that the bark is rapidly growing over the wound and eventually the bark will entirely cover such a wound, particularly a wound not too large, and in time no trace of the wound will be noticeable.

The distillation of rubber and a rubber residue suitable for use in carrying out the present invention are disclosed and claimed in my copending application, Serial No. 724,951, filed May 10, 1934.

I claim:

1. As a tree dressing, asphalt, residue from the distillation of rubber, a plasticizer, inert filler and a solvent, over which when applied to the wood of a tree, after evaporation of the solvent, the bark will rapidly grow.

2. As a tree dressing, a trowelable plastic composition comprising asphalt, residue from the distillation of rubber, inert filler and a solvent.

3. As a tree dressing, a trowelable composition which comprises rubber distillation residue and when applied in a thin layer to a vertical surface, upon evaporation of the solvent will not flow when subjected to summer heat, and which will not become brittle at winter temperatures.

4. As a tree dressing, a trowelable composition comprising blown asphalt, residue from the distillation of rubber, filler and a volatile solvent.

5. As a tree dressing, a trowelable composition comprising blown asphalt, residue from the distillation of crude rubber, filler and a volatile solvent.

6. As a tree dressing, a trowelable composition comprising blown asphalt, residue from the distillation of vulcanized rubber and a volatile solvent.

CLAUDE H. SMITH.